(12) United States Patent
Lee et al.

(10) Patent No.: US 8,490,326 B1
(45) Date of Patent: Jul. 23, 2013

(54) HYDRO STRAW MULCH METHOD

(76) Inventors: Edward Lee, Manteno, IL (US); Terry Peters, Worley, ID (US)

( * ) Notice: Subject to any disclaimer, the term of this patent is extended or adjusted under 35 U.S.C. 154(b) by 0 days.

(21) Appl. No.: 12/961,938

(22) Filed: Dec. 7, 2010

Related U.S. Application Data

(62) Division of application No. 11/253,957, filed on Oct. 19, 2005, now Pat. No. 7,891,133.

(51) Int. Cl.
*A01G 7/00* (2006.01)

(52) U.S. Cl.
USPC .............................................. 47/9; 47/58.1 R

(58) Field of Classification Search
USPC .................... 47/9, DIG. 9, DIG. 10, 58.1 SC, 47/1.01 T, 1.01 F, 57.6, 58.1 R
See application file for complete search history.

(56) References Cited

U.S. PATENT DOCUMENTS

| | | | | |
|---|---|---|---|---|
| 4,297,810 | A * | 11/1981 | Hansford | 47/9 |
| 6,360,478 | B1 * | 3/2002 | Spittle | 47/9 |
| 7,900,394 | B2 * | 3/2011 | Ellis et al. | 47/9 |

FOREIGN PATENT DOCUMENTS

CA 263672 * 10/1976

OTHER PUBLICATIONS

Review of Biomass Size Reduction Technology, The Society for engineering in agricultural, food, and biological systems ASAE, Manly Yu et al, Jul. 2003, p. 8 line 5-11.*

* cited by examiner

*Primary Examiner* — Andrea Valenti
(74) *Attorney, Agent, or Firm* — Wyatt, Tarrant & Combs, LLP; William S. Parks

(57) ABSTRACT

A combination hydro straw mulch is used for hydroseeding and hydromulching for seed establishment and erosion control. The formulation of the mulch is preferably, but not limited to, approximately 85% hammermilled straw, approximately 10% hammermilled paper, and approximately 5% processed jute fibers. The hammermilled straw is preferably Kentucky Bluegrass straw. The hammermilled paper particles are used for its water holding capacity. The paper aids in pumpability and reduces the amount of water required for pumping a quantity of mulch. The processed jute fibers tangle the straw fibers on the ground to produce a secure ground covering. The hydro straw mulch of the present invention may include other additives as well. Tackifiers and flocculants aid pumpability and help tack the straw fibers to the ground and aid in water infiltration and water clarity. A surfactant ensures wettability. Other additives include green dye.

19 Claims, 1 Drawing Sheet

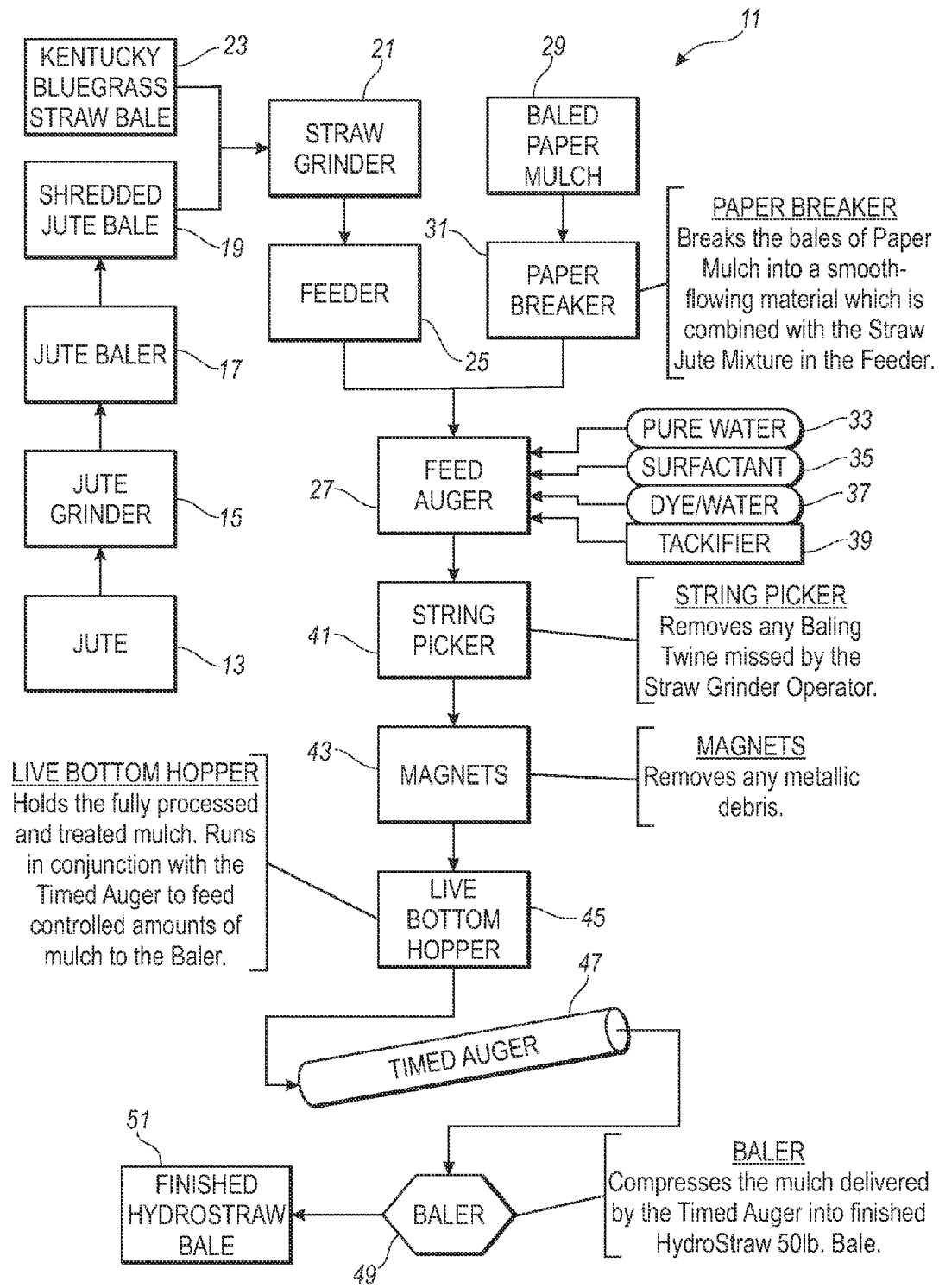

HYDRO STRAW MULCH METHOD

CROSS REFERENCE TO RELATED APPLICATIONS

This application is a Divisional of U.S. Ser. No. 11/253,957, filed on Oct. 19, 2005, now U.S. Pat. No. 7,891,933, the specification of which is entirely incorporated by reference herein.

FIELD OF THE INVENTION

The present invention relates to the field of erosion control and seed establishment with hydroseeding and hydromulching.

BACKGROUND OF THE INVENTION

Existing systems for erosion control and seed establishment use paper or wood hydro mulch. These paper or wood hydro mulches are difficult to use and have low performance efficiencies. Additionally, application of paper and wood hydro mulches is limited by the amount of water that can be carried on a hydro mulch spreader. Generally, paper and wood hydro mulches require large quantities of water for efficient spreading. Use of straw mulches has not been successful in hydro seeding.

Clogging of the pumps and nozzles during hydroseeding and hydromulching is a problem that needs to be carefully avoided. Stopping operations to clean pumps and nozzles creates down time and can require disassembly and reassembly or replacement at great costs. When hydroseeding or hydromulching is done along highways and roads delays increase dangers associated with these operations.

Generally, paper or wood hydro mulches spread seed and mulch by using truck mounted pumps and water cannons for large area applications. Alternatively, the water, mulch and seed mix may be pumped and distributed through hoses and nozzles for residential type applications.

Straining and stratification of the components of the water, seed and mulch mixture by bunching and accumulating of some mulch components is a problem that may not be noticed for extended times, even several months. The first indication of a problem may be grass coverage inconsistencies in the hydroseeded and hydromulched areas. Problems are encountered that must be resolved. Reseeding with attendant time and materials may be necessary with high costs.

To prevent product or component jams high ratios of water to solids are used. High rations of water to solids require time interruptions for terminating hydroseeding or hydromulching while replenishing water tanks on trucks.

Needs exist for new products that require less water for application and that improve and increase erosion control and seed establishment.

SUMMARY OF THE INVENTION

The present invention provides a high lofted product that is a combination of fine hammermilled straw and hammermilled paper for partially releasing fibers. The fibers remain attached at ends to other fibers in the straw shafts and the paper particles. Jute fibers are processed, such as by hammermilling, to release short individual fibers that are used in small quantities to tangle the straw fibers. One product is a combination of straw, paper and jute fibers with tackifiers, flocculants and surfactants. The flocculants agglomerate neighboring, fluffed exposed fibers on the expanded straw particles.

The tackifiers hold the straw fibers together and on the ground. The surfactants suspend the solids in the water and aid pumpability. The tackifiers also aid in holding the fibers attached to adjacent fibers. The tackifiers, flocculants, and surfactants are also agro chemicals that aid growth when the products are used in hydroseeding and hydromulching for seed establishment and erosion control.

The invention includes a combination straw mulch using as a primary fiber up to about 40 to 90 percent or more fine lawn grass straw, which is a byproduct of lawn seed production, or other types of straw. The straw is hammermilled for shortening, separating and abrading. The straw may be blown against abrading wheels or mixed with abraidant, and is then separated from the abraidant, such as by air stratification.

The preferred mixture also includes up to about 5 to 60 percent or more by weight hammermilled paper particles mixed with the fine grass straw for holding water and pumpability. Up to about 5 percent or more, by weight, of jute fibers are used to tangle with the straw fibers and the paper particles on the ground. The jute fibers are processed by hammermilling. Jute fibers are chopped and recycled from sources such as baled jute fibers or burlap bag scrap.

About one to five percent by weight of tackifier and 0.25 percent or less by weight of flocculent are mixed with the fibers for wetting the fibers, reducing stratification and for lubrications of pumps in hoses to reduce clogging in the hydroseeder. The tackifier is preferably an organic tackifier such as guar, plantago or starch based tackifiers. The flocculant is preferably, but not limited to, PAM (polyacrylamide). Sufficient surfactant, such as ionic or non-ionic detergent, for example, less than about one half percent, is added to wet all of the water, paper and fibers, and to promote fast water absorption in the mixing tank prior to pumping and after spreading when lying on the ground and receiving water through rain or irrigation.

The hydro straw mulch of the present invention is composed of mainly straw, and enables pumps to pass the mulch easily through a hydroseeder and perform erosion control and seed establishment equal to or better than the industry standard wood and paper hydro mulches. The straw, paper and jute hydromulch is hydraulically spread in a slurry solution and normally contains seed and fertilizer with the mulch.

After the straw and jute are hammermilled the paper, tackifier, flocculent, surfactant and dye is added before they compressed into bales, usually of about 40-50 lbs each. The compressed bales reduce freight costs and provide easy onboard storage on hydroseeding units. This present invention is use the same way as conventional wood or paper hydromulch. The, dry materials in the bales are broken up and fed into hydroseeder tank as water is being added. The water and dry materials are fed into a mixing tank in a hydroseeder in predetermined proportions. Fertilizer and seed may be added to the dry mulch material as it is broken up or to the water mixing tank. Various ratios and mixtures are possible. The mixer apparatus combines and wets the materials before the slurry passes from the mixer apparatus directly into the pump intake.

The hydro straw mulch of the present invention may be run at approximately 75 lbs mulch in approximately 100 gallons of water when doing hydroseeder tower work and 60 lbs mulch in approximately 100 gallons of water when Hydroseeding with a hose.

The formulation of the present invention is preferably, but not limited to, approximately 40-90%, and preferably about 85%, hammermilled straw, approximately 5-50%, and preferably about 10%, hammermilled paper, approximately 2-10%, and preferably about 5%, processed jute fibers by weight, and about 0.5% to 5% of the of tackifiers, flocculants and surfactants.

The hammermilled straw is preferably, but not limited to, Kentucky Bluegrass straw. The hammermilled straw may also be grass seed, cereal grains, rice, soybeans, kenaf, or combinations thereof. In one embodiment, the straw is a fine lawn grass straw separated from lawn seed and hammermilled to sizes of about 6 to 13 mm, and preferably abraided to partially release fibers for entanglement. The paper is hammermilled to industry standards or purchased pre-ground. The hammermilled paper is used for its water holding capacity. The paper aids in pumpability and reduces mulch clogging in the hydroseeding machine hoses and pump. That increases the operational time of hydroseeders and hydromulch spreaders by reducing the down time required for refilling onboard water tanks. The processed jute fibers tangle the straw fibers on the ground to produce a secure ground covering. The jute fibers are hammermilled to a size of about 7-15 mm, and have fully or partially exposed naturally crimped fibers for entangling the straw fibers.

The hydro straw mulch of the present invention may include fertilizer and other additives as well. Organic tackifiers and PAM flocculants aid pumpability and help tack the straw fibers to the ground. A surfactant ensures wettability of the straw fibers, paper, and jute fibers during the mixing process and during rain or irrigation while the product is on the ground. Other additives may include green dye for providing optical feedback of coverage when hydroseeding.

The jute fibers aid entanglement without reducing pumpability.

In another embodiment of the product, hammermilled grass straw, which has been shortened and from which fiber ends extend, is mixed with hammermilled paper particles with or without a small amount of jute fibers to aid tangling.

These and further and other objects and features of the invention are apparent in the disclosure, which includes the above and ongoing written specification, with the drawings.

BRIEF DESCRIPTION OF THE DRAWING

FIG. 1 is a schematic diagram of the product process.

DETAILED DESCRIPTION OF THE PREFERRED EMBODIMENTS

The present invention provides a high lofted product that is a combination of fine hammermilled straw and hammermilled paper for partially releasing fibers. The fibers remain attached at ends to other fibers in the straw shafts and the paper particles. Jute fibers are processed, such as by hammermilling, to release short individual fibers that are used in small quantities to tangle the straw fibers. The product is a combination of straw, paper and jute fibers with tackifiers, flocculants, dye and surfactants. The flocculants aids in soil water infiltration rates and increase water clarity of runoff. The tackifiers hold the straw fibers together and on the ground. The surfactants suspend the solids in the water and aid pumpability. The tackifiers also aid in holding the fibers attached to adjacent fibers. The tackifiers, flocculants, and surfactants are also agro chemicals that aid growth when the products are used in hydroseeding and hydromulching for seed establishment and erosion control.

FIG. 1 shows a process 11 for creating the product. Jute 13 is fed into a jute grinder 15. The ground jute is then fed into a jute baler 17 to create a jute bale. The jute bale is then shredded 19 before being fed into a straw grinder 21 with bales of grass straw 23. The combined jute and grass straw are processed in the straw grinder 21. The ground straw and jute exit the straw grinder 21 and are transported to a feeder 25. The feeder 25 supplies the ground straw and jute to a feed auger 27. Baled paper mulch 29 is fed into a paper breaker 31. The paper breaker 31 breaks the bales of paper mulch into a smooth flowing material that is combined with the straw and jute mixture in the feed auger 27.

While the feed auger 27 moves the mixed straw, jute and paper mulch, additives are added. Additives may include pure water 33, surfactant 35, dye water 37, tackifier 39 and other additives. The processed mixture of straw, jute and paper then passes through a string picker 41. The string picker 41 removes any bailing twine missed by the straw grinder 21. The mixture of straw, jute and paper then passes through a magnetic device 43 that removes any metallic debris.

The processed combination of straw, jute and paper is then held in a live bottom hopper 45. The live bottom hopper 45 holds the fully processed and treated mulch. The live bottom hopper 45 operates in conjunction with a timed auger 47 that feeds controlled amounts of mulch to a baler 49. The baler 49 compresses the mulch from the timed auger 47 into bales of a desired size. Finished bales 51 exit the baler 49.

The invention includes a combination straw mulch using as a primary straw fiber up to about 40 to 90 percent or more fine lawn grass straw, which is a byproduct of lawn seed production, or other types of straw. The straw is hammermilled for shortening, separating and abraiding. The straw may be blown against abraiding wheels or mixed with abraidant, and is then separated from the abraidant, such as by air stratification. Alternatively, the straw may be fiberized by steaming and disc milling in a fiberizing mill.

The preferred mixture also includes up to about 5 to 60 percent or more by weight hammermilled paper particles mixed with the fine grass straw for holding water and pumpability. Up to about 5 percent or more, by weight, of jute fibers are used to tangle with the straw fibers and the paper particles on the ground. The jute fibers are processed by hammermilling. Jute fibers are chopped and recycled from sources such as baled jute fibers or burlap bag scrap.

About one to five percent by weight of tackifier and about 0.25 percent or less by weight of flocculent are mixed with the fibers for wetting the fibers and preventing stratification. The tackifier is preferably an organic tackifier such as guar, plantago or starch based tackifiers. The flocculent is preferably, but not limited to, PAM (polyacrylamide). Sufficient surfactant, such as ionic or non-ionic detergent, for example, less than about one half percent, is added to wet all of the water, paper and fibers, and to promote fast water absorption in the mixing tank prior to pumping and after spreading when lying on the ground and receiving water through rain or irrigation.

The hydro straw mulch of the present invention is composed of mainly straw, and enables pumps to pass the mulch easily through a hydroseeder and perform erosion control and seed establishment equal to or better than the industry standard wood and paper hydro mulches. The straw, paper and jute hydromulch is hydraulically spread in a slurry solution and normally contains seed and fertilizer with the mulch.

After the elements are hammermilled and the ingredients are added and then compressed into bales, usually of about 40-50 lbs each. The compressed bales reduce freight costs and provide easy onboard storage on hydroseeding units. In order to use the hydromulch of the present invention, dry materials in the bales are broken up and fed into a dry hopper, which further reduces and separates clumps. Water is held in a reservoir on the hydroseeder or hydromulch spreader. The water and dry materials are fed into a mixing tank in a hydroseeder in predetermined proportions. Fertilizer and seed may be added to the dry mulch material as it is broken up or to the water mixing tank. Various ratios and mixtures are possible. The mixer apparatus combines and wets the materials before the slurry passes from the mixer apparatus directly into the pump intake. The hydro straw mulch of the present invention may be run at approximately 75 lbs mulch in approximately 100 gallons of water when doing hydroseeder tower work and 60 lbs mulch in approximately 100 gallons of water when Hydroseeding with a hose.

The formulation of the present invention is preferably, but not limited to, approximately 40-90%, and preferably about 85%, hammermilled straw, approximately 5-50%, and preferably about 10%, hammermilled paper, approximately 2-10%, and preferably about 5%, processed jute fibers by weight, and about 1% to 5% additives of tackifiers, flocculants, dye and surfactants.

The hammermilled straw is preferably, but not limited to, Kentucky Bluegrass straw. In one embodiment, the straw is a fine lawn grass straw separated from lawn seed and hammermilled to sizes of about 6 to 13 mm, and preferably abraided to partially release fibers for entanglement. The paper is hammermilled to industry standards or purchased preground. The hammermilled paper is used for its water holding capacity. The paper aids in pumpability and reduces clogging in hoses and pump of the hydroseeder. That increases the operational time of hydroseeders and hydromulch spreaders by reducing the down time required for refilling onboard water tanks. The processed jute fibers tangle the straw fibers on the ground to produce a secure ground covering. The jute fibers are hammermilled to a size of about 7-15 mm, and have fully or partially exposed naturally crimped fibers for entangling the straw fibers.

The hydro straw mulch of the present invention may include fertilizer and other additives as well. Organic tackifiers and PAM flocculants aid pumpability and help tack the straw fibers to the ground and aid in water infiltration and water clarity. A surfactant ensures wettability of the straw fibers, paper, and jute fibers during the mixing process and during rain or irrigation while the product is on the ground. Other additives may include green dye for providing optical feedback of coverage when hydroseeding.

The jute fibers aid entanglement without reducing pumpability.

In another embodiment of the product, hammermilled grass straw, which has been shortened and from which fiber ends extend, is mixed with hammermilled paper particles with or without a small amount of jute fibers to aid tangling.

While the invention has been described with reference to specific embodiments, modifications and variations of the invention may be constructed without departing from the scope of the invention.

What is claimed is:

1. A method of producing a hydro mulch product comprising the following steps:
    a) providing fibrous straw with short straw shafts through a hammer milling procedure,
    b) subsequently treating said fibrous straw having short straw shafts to cause fibers to be partially exposed from and extending from said straw shafts,
    c) providing paper particles,
    d) optionally providing jute fibers,
    e) mixing and compressing the fibrous straw, the paper particles and the optional jute fibers, and
    f) packaging the compressed mixed fibrous straw, paper particles and optional jute fibers.

2. The method of claim 1 wherein said jute fibers are present.

3. The method of claim 1, further comprising providing tackifiers, flocculants, and surfactants to the fibrous straw, paper particles and optional jute fibers before the mixing and compressing step.

4. The method of claim 3 wherein said jute fibers are present.

5. The method of claim 3 wherein said tackifier is an organic tackifier and wherein said flocculent is polyacrylamide.

6. The method of claim 5 wherein said jute fibers are present.

7. The method of claim 3 wherein said jute fibers are present.

8. The method of claim 1, wherein the packaging step further comprises forming the compressed mixed fibrous straw, paper particles and optional jute fibers into bales.

9. The method of claim 8, further comprising breaking up said bales, mixing the resultant broken bales with water, forming a slurry, pumping the slurry, and distributing the pumped slurry during a hydromulching process.

10. The method of claim 1, wherein the fibrous straw is present in an amount of about 60 to about 90 percent, the paper particles are present in an amount of about 5 to about 20 percent, and the optional jute fibers are present in an amount of about 2 to about 10 percent, all by weight.

11. The method of claim 10 wherein said jute fibers are present.

12. The method of claim 1, further comprising providing water in a ratio of about 30 percent to about 60 percent for mixing with about 70 percent to about 40 percent of the mixed fibrous straw, paper particles and optional jute fibers, and pumping the mixed water and product from a hydromulcher apparatus.

13. The method of claim 12 wherein said jute fibers are present.

14. The method of claim 1 wherein step "b" involves treatment of said fibrous straw through an abrading process to cause fibers to be partially exposed from and extending from said straw shafts.

15. The method of claim 14 wherein said jute fibers are present.

16. The method of claim 15, further comprising providing tackifiers, flocculants, and surfactants to the fibrous straw, paper particles and optional jute fibers before the mixing and compressing step.

17. The method of claim 1 wherein step "b" involves treatment of said fibrous straw through an fiberizing process to cause fibers to be partially exposed from and extending from said straw shafts.

18. The method of claim 17 wherein said jute fibers are present.

19. The method of claim 18, further comprising providing tackifiers, flocculants, and surfactants to the fibrous straw, paper particles and optional jute fibers before the mixing and compressing step.

* * * * *